United States Patent [19]
Sasaya

[11] Patent Number: 5,247,833
[45] Date of Patent: Sep. 28, 1993

[54] WATER LEVEL MEASURING APPARATUS
[75] Inventor: Toshihisa Sasaya, Kawasaki, Japan
[73] Assignee: Fujitsu Limited, Kanagawa, Japan
[21] Appl. No.: 924,749
[22] Filed: Aug. 4, 1992
[30] Foreign Application Priority Data
    Aug. 6, 1991 [JP] Japan .................. 3-196243
[51] Int. Cl.⁵ .................. G01F 23/14; H01H 35/18
[52] U.S. Cl. .................. 73/301; 200/84 B;
                              340/614; 364/509; 364/571.04
[58] Field of Search .................. 73/299, 301, 319;
                                        364/509, 571.01, 571.04
[56] References Cited
    U.S. PATENT DOCUMENTS
    3,973,437  8/1976  Yanagihara et al. .................. 73/301
    4,706,203 11/1987  Ramsdale et al. .................. 364/509
    4,739,494  4/1988  Torii .................. 73/301 X
    4,972,327 11/1990  Kotulla .................. 364/509
    5,121,051  6/1992  Steinbrecher et al. .... 364/571.01 X Primary Examiner—Daniel M. Yasich
Attorney, Agent, or Firm—Armstrong, Westerman, Hattori, McLeland & Naughton

[57] ABSTRACT

An apparatus for measuring a water level of a dam by combining a pressure type water level gauge measuring the water level by detecting water pressure at a bottom of the dam, with a plurality of float type water level switches arranged along the depth of the dam and provided at an interval less than a tolerance allowed to the gauge. Obtaining a water level difference between the water level measured by the gauge and the water level at the switch respectively, the gauge water level is corrected to a water level obtained by subtracting the difference at one of the switches from the gauge water level, when a water surface of the dam is located between the one of the switches and the gauge or an adjacent switch. The abnormality of the gauge is found by detecting whether the difference exceeds a water level tolerance allowed to the gauge.

4 Claims, 5 Drawing Sheets

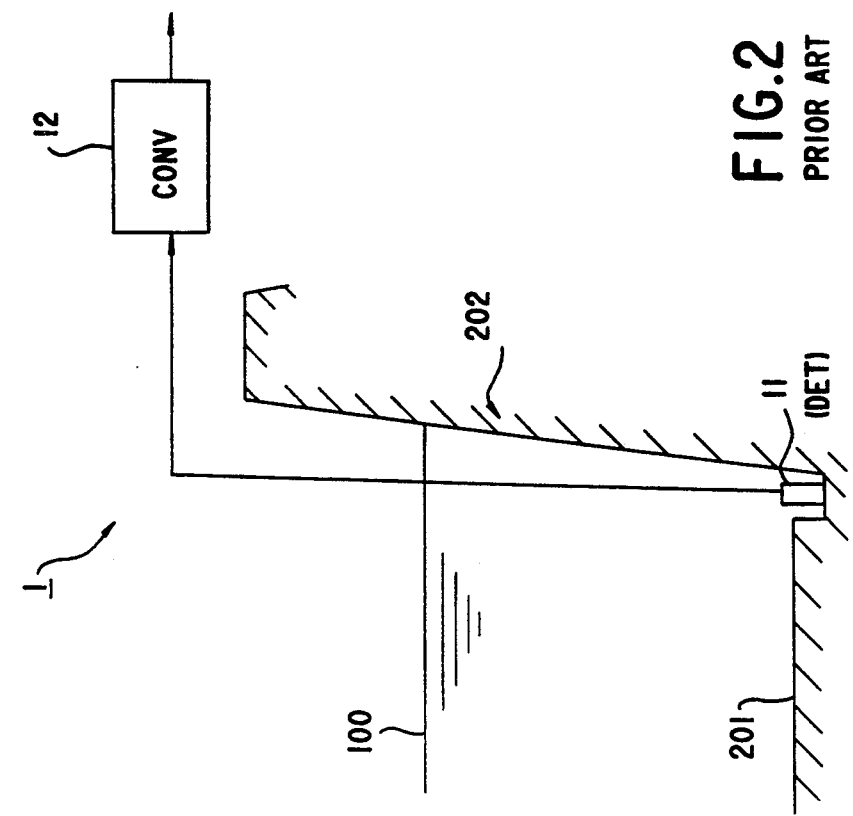
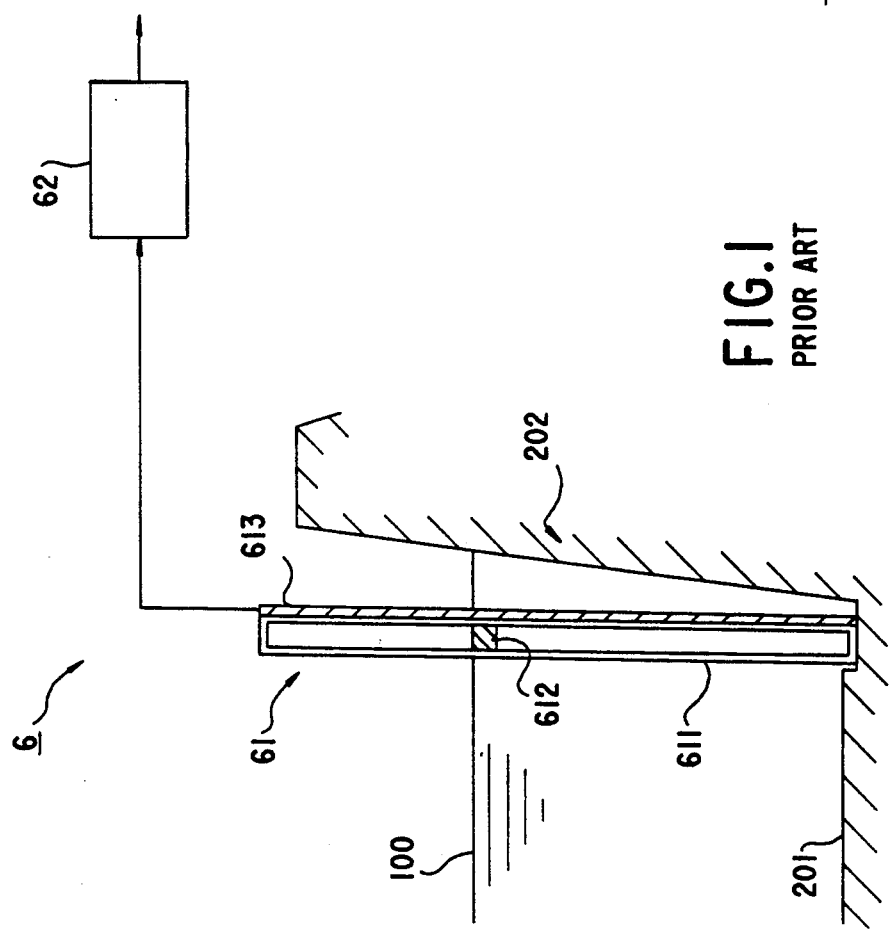

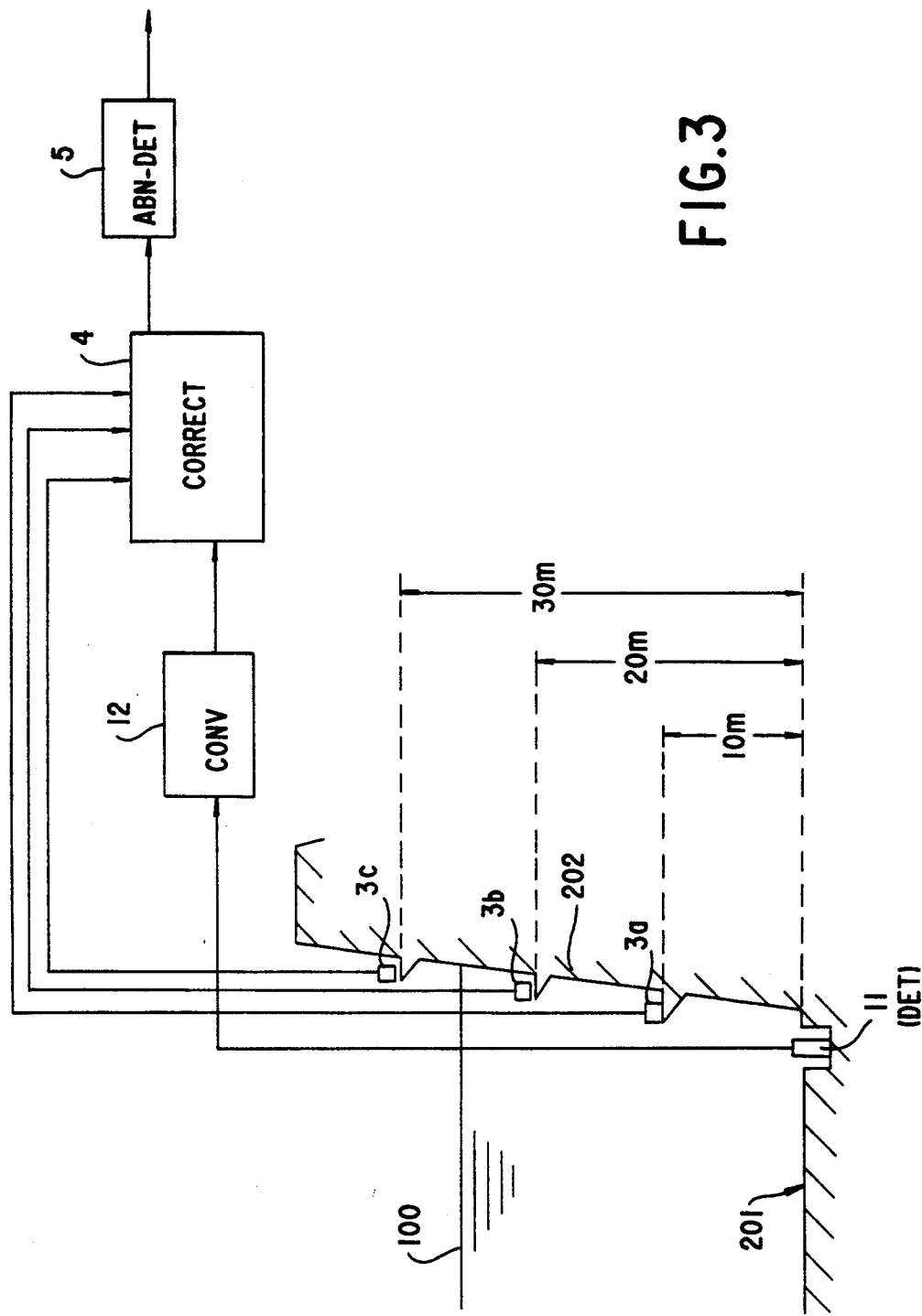

WATER LEVEL MEASURING APPARATUS

BACKGROUND OF THE INVENTION

1. Field of the Invention

The present invention relates to a water level measuring apparatus for measuring a water level of a dam or a river.

2. Description of the Related Art

The water level of a dam (or a river) is an important datum for watching an overflow from the dam and a water quantity left for water-utilization when the water level is high and low respectively. Therefore, in order to measure the water level, the water level measuring apparatus is required to have very high accuracy such as plus or minus one centimeter, over a large depth of the dam like several tens of meters.

As a related art, there have been two types of water level measuring apparatus. One is a pressure type water level gauge which measures the water level by detecting the water pressure proportional to the water level at a bottom of the dam, and the other is a float type water level gauge which measures the water level by detecting a position of a float moving up and down with a water surface of the dam. Recently, the pressure type water level gauge is used widely, because, the pressure type water level gauge can be provided in cheap and less installation costs, compared with the float type water level gauge.

However, the pressure type water level gauge has a defect that the more the water level becomes high, the more an error increases. Therefore, when the dam is deep as much as several tens of meters, the float type water level gauge has been used though a lot of costs are required, in particular, for the installation thereof.

The float type water level gauge has accuracy as high as plus or minus one centimeter. FIG. 1 shows a schematic illustration for explaining a float type water level gauge 6 installed in the dam. The float type water level gauge 6 consists of a water level detection unit 61, a signal converter 62 and an electrical wire for connecting water level detection unit 61 with signal converter 62. The water level detection unit 61 consists of a pipe unit 611, a float unit 612 moving up and down in pipe unit 611 with the movement of a water surface 100 of the dam and a level signal generator 613 for generating an analog water level signal corresponding the position of moving float unit 612. The analog water level signal is sent from level signal generator 613 to signal converter 62 and converted to a digital water level signal which is an output signal of float type water level gauge 6.

The float type water level gauge 6 has a merit of having high accuracy in the measurement of the water level. This is because of a feature of the float. However, float type water level gauge 6 has a demerit of requiring a great deal of costs for installation. As shown in FIG. 1, a large size of water level detection unit 61 must be fixed to a bottom 201 after the severe investigation of the farm ground for the installation. When the dam has a depth of 50 m for example, water level detection unit 61 having the height of more than 50 m and the inner diameter of 600 mm must be installed in the dam, which results in requiring a great deal of manufacturing and installation costs.

Meanwhile, the pressure type water level gauge is widely used recently, because, it can be installed at any place with less installation costs, compared with the float type water level gauge. FIG. 2 shows a schematic illustration of a pressure type water level gauge 1 installed in the dam. In FIG. 2, the same reference numeral as in FIG. 1 designates the same thing as in FIG. 1. The pressure type water level gauge 1 consists of a water pressure detector (DET) 11, a signal converter (CONV) 12 and an electrically connecting wire for connecting DET 11 with CONV 12. The DET 11 is placed on bottom 201 and an element such as quartz is provided therein so as to produce an analog signal proportional to the water pressure or the water level of the water in the dam. The analog signal from DET 11 is sent to CONV 12 through the connecting wire and converted into a digital signal represented by, for example, four figures in the BCD (Binary Coded Decimal) system. The pressure type water level gauge 1 is convenient in use with less installation costs, however, produces the larger error, compared with float type water level gauge 6. The pressure type water level gauge 1 produces at least 0.1% of a relative error. Therefore, when DET 11 is placed on bottom 201 in the dam having 50 m depth, 5 cm of the relative error is produced. This 5 cm of the error is great in case where the dam has a large scale. Considering such large error, the pressure type water level gauge is inadequate for measuring the water level of the deep dam. Therefore, in order to measure the water level in such deep dam, two ways, a first way and a second way, have been taken in the prior art. The first way is of using the float type water level gauge over the whole depth. The second way is of separating the depth into high and low regions so that the float type water level gauge and the pressure type water level gauge are used for the high and the low region respectively. The first way is excellent because of the high accuracy but requires too much costs for manufacturing and installation as explained before. The second way is reasonable in accuracy and costs but unreasonable in operation reliability because of too much complexity in constitution.

SUMMARY OF THE INVENTION

An object of the present invention is to improve the water level measuring apparatus so that the water level of the dam can be measured over the long span with high accuracy.

Another object of the present invention is to provide a water level measuring apparatus easy to be installed with low costs.

Still another object of the present invention is to provide a water level measuring apparatus having simple constitution and high operation reliability.

The above objects are achieved by:

combining a pressure type water level gauge (GAUGE) including a water pressure detector set on a bottom of the dam, with a plurality of water level switches (SWs) arranged in a height direction of the dam at a fixed height from a bottom of the dam respectively, so that heights between the bottom and SW fixed just above the bottom and between SWs neighboring each other are less than a tolerance allowed to GAUGE having in its water level measurement respectively;

correcting the errors in the water levels output from GAUGE, by using fixed water levels at SWs; and detecting the abnormality of GAUGE, by also using the fixed water levels at SWs.

The error correction is performed by:

obtaining, on each SW, a water level difference between a water level measured by GAUGE at a fixed position of SW and the fixed water level on SW, every time a water surface of the dam passes through SW; and correcting the water level measured by GAUGE to a water level obtained by subtracting the water level difference at one of SWs, from the water level measured by GAUGE, when the water surface is located between two SWs each being neighboring the one of SWs or between the bottom and SW just above the bottom.

The abnormality detection is performed by comparing the water level difference with a base datum and producing a judging result whether the GAUGE is operating normally. The base datum based is a datum on a tolerance error in the water level measurement accuracy of the GAUGE.

BRIEF DESCRIPTION OF THE DRAWINGS

FIG. 1 is an illustration for explaining the constitution and operation of the prior art float type water level gauge installed in the dam;

FIG. 2 is an illustration for explaining the constitution and operation of a pressure type water level gauge installed in the dam;

FIG. 3 is an illustration for explaining the constitution and operation of a water level measuring apparatus embodying the present invention;

DESCRIPTION OF THE PREFERRED EMBODIMENT

Figure 4A:
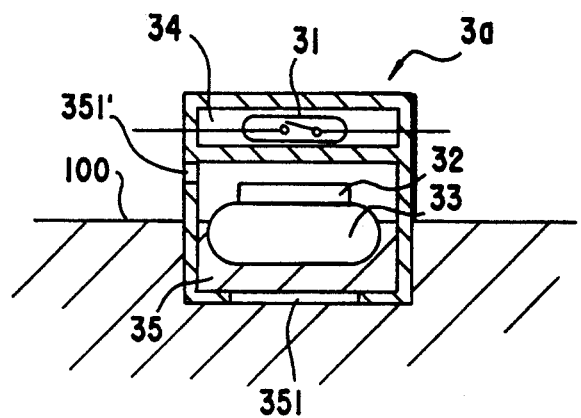
FIG. 4a is an illustration for explaining the construction and operation of a water level switch (SW) applied to the invented water level measuring apparatus in a case where the water level is low so that a float in SW makes no contact of a lead-switch.

FIG. 3 is a water level measuring apparatus embodying the present invention. In FIG. 3, the same reference numeral as in FIG. 2 designates the same unit as in FIG. 2. In the preferred embodiment, a plurality of water level switches (SWs), for example, 3a, 3b and 3c are newly arranged on the inner surface of bank 202 together with pressure type water level gauge 1 as shown in FIG. 1. The SW 3a, 3b or 3c is a simple and small device being a kind of floating type and produces an ON-OFF signal, every time the water surface 100 passes through SW 3a, 3b or 3c. Since SWs 3a, 3b and 3c are arranged on support means in the previously known height from the bottom 201, water levels corresponding to SWs 3a, 3b and 3c can be used in response to the ON-OFF signals. Further, since SWs 3a, 3b and 3c are highly reliable devices having high accuracy, the water levels on SWs 3a, 3b and 3c can be used as basic levels for correcting the water level measured by pressure type water level gauge 1. Thus, according to the present invention, the water level of the dam can be measured over the long span in low costs by using the pressure type water level gauge but in higher accuracy by using the SWs. The structure of SWs 3, 3b and 3c will be explained later in reference to FIGS. 4(a) and 4(b).

Generally, the error occurring in the pressure type water level gauge is represented as $$\text{error [cm]} = \text{measuring span [cm]} \times \text{relative accuracy [\%]}/100 \quad (1),$$

wherein, "measuring span" is equal to the depth of water stored in the dam. If the measuring span tolerance [cm] allowed to be in the water level measurement is applied to "error" in equation (1), the measuring span having error but within the tolerance, which will be called "tolerated measuring span" below, is obtained as $$\text{tolerated measuring span [cm]} = \text{tolerance [cm]}/(\text{relative accuracy [\%]}/100) \quad (2).$$

Therefore, in FIG. 3, when SWs 3a, 3b and 3c are arranged every "tolerated measuring span" from bottom 201 to the top of the dam and the output from pressure type water level gauge 1 are corrected with the water levels on SWs 3a, 3b and 3c, the data of depth can be obtained over the whole span (depth) of the dam, only having error within the tolerance.

For example, When, plus or minus 1 cm and 0.1% are put in "tolerance" and "relative accuracy" respectively in the above equation (2), the tolerated measuring span is obtained as $$\text{tolerated measuring span [cm]} = 1 \text{ [cm]}/(0.1 \text{ [\%]}/100) = 1000 \text{ [cm]}. \quad (3)$$

This means that 1 cm of tolerance can be kept in the output from pressure type water level gauge 1 as far as SWs 3a, 3b and 3c are arranged every 10 m from bottom 201 to the top of the dam as shown in FIG. 3.

Further, since SWs 3a, 3b and 3c are positioned so that the measured error never exceeds the tolerance in the above correction, it can be judged whether pressure type water level gauge 1 operates in a normal state, by detecting if the measured error exceeds the tolerance.

Figure 4B:
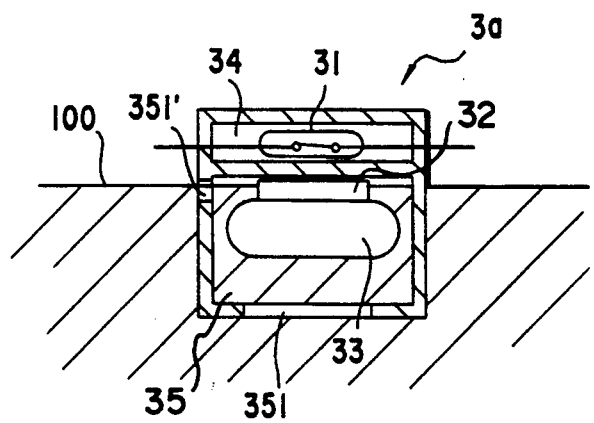
FIG. 4b is the same illustration as in FIG. 4a, in a case where the water level is high so that the float makes the contact of the lead-switch.

FIGS. 4a and 4b are schematic cross sectional views of the water level switch represented by SW 3a, for illustrating the structure and operation thereof. In FIGS. 4a and 4b, the same reference numeral as in FIG. 3 designates the same thing as in FIG. 3. The SW 3a is a kind of float switch. As shown in FIGS. 4a and 4b, SW 3a has two rooms, a switch housing room 34 and a float housing room 35. The switch housing room 34 has watertight structure including a lead-switch 31, and float housing room 35 has water-free structure including a float 33 attaching a piece of magnet 32 at a side facing to a wall separating switch housing room 34 from float housing room 35. When SW 3a is dipped in water, float 33 floats in water coming into float housing room 35 through hole 351, sending air out from room 35 through a hole 351', so that magnet 32 touches the wall. As well known, lead-switch 31 includes an electrical contact which is made only when lead-switch 31 is in proper magnetic field. Therefore, lead-switch 31 makes no contact as far as magnet 32 is separated from lead-switch 31, as shown in FIG. 4a, but when magnet 32 approaches lead-switch 31 so as to touch the wall, lead-switch 31 makes contact as shown in FIG. 4b. Since SW 3a has simple structure and constitution, SW 3a operates accurately and is highly reliable.

The lead-switch 31 produces ON or OFF signal (ON-OFF signal) alternating every time water surface 100 passes through SW 3a, 3b or 3c. When water surface 100 comes between SWs adjacent each other such as 3b and 3c as shown in FIG. 3, SWs 3a and 3b produce ON signal respectively but SW 3c produces OFF signal. In FIG. 3, the ON-OFF signals from SWs 3a, 3b and 3c are sent to a data corrector (CORRECT) 4 in which the water level data output from pressure type water level gauge 1 is corrected by using the water level data on SWs 3a, 3b and 3d, and data on correction value obtained in the correction steps performed in CORRECT 4 is sent to an abnormality detector (ABN-DET) 5 in which the abnormality of the operation in pressure type water level gauge 1 is detected.

Figure 5:
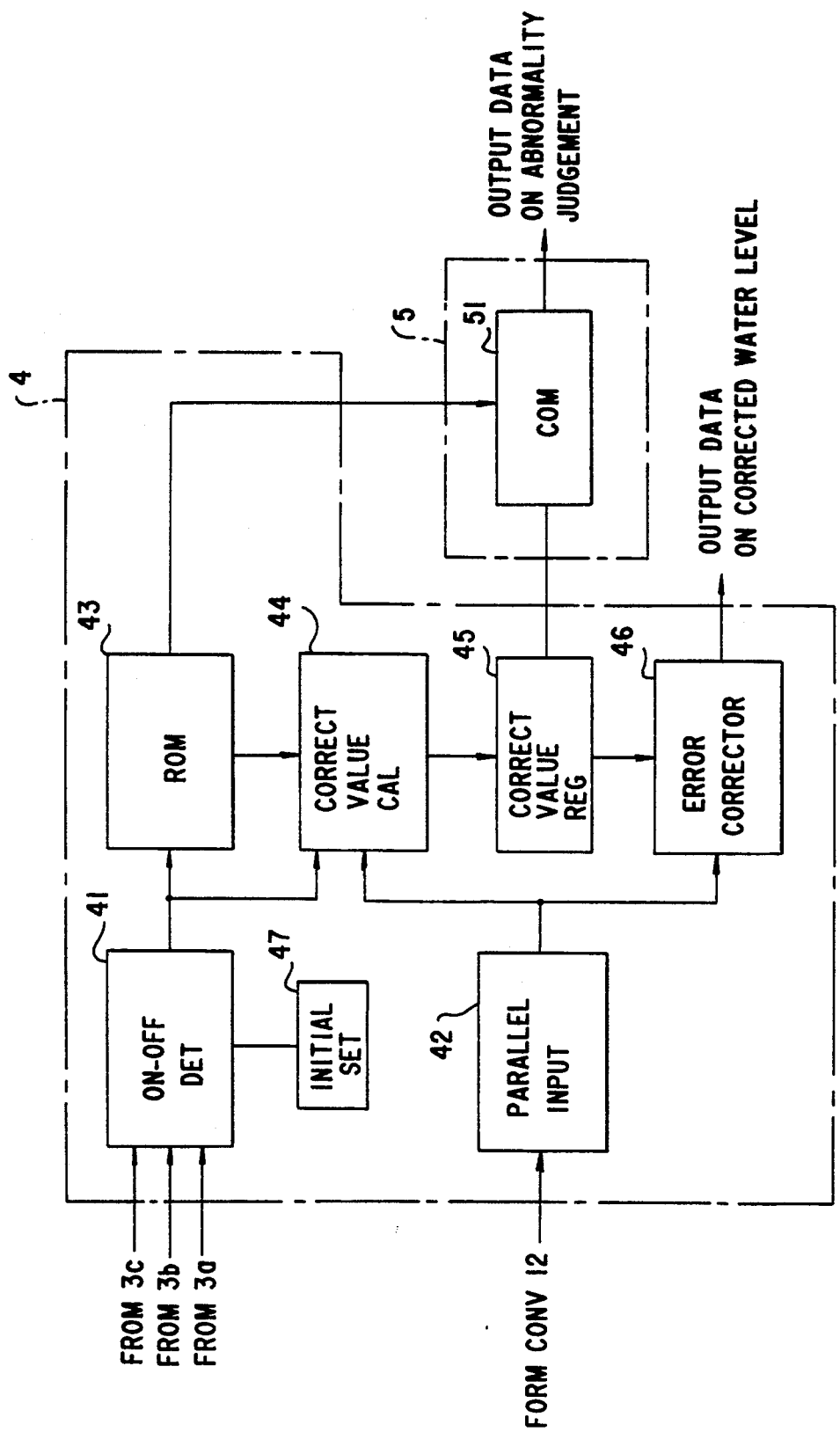
FIG. 5 is a schematic block diagram for a data corrector (CORRECT) and abnormality detector (ABN-DET) provided in the water level measuring apparatus embodying the present invention.

FIG. 5 shows block diagrams of CORRECT 4 and ABN-DET 5. In FIG. 5, the same reference numeral as in FIG. 3 designates the same unit as in FIG. 3.

The CORRECT 4 consists of: an ON-OFF detector (ON-OFF DET) 41 for detecting the alternation of the ON-OFF signals from SWs 3a, 3b and 3c and producing a triggering signal for informing that either one of the ON-OFF signals from SWs 3a, 3b and 3c is altered from ON to OFF or vice versa; a parallel input circuit (PARALLEL INPUT) 42 for receiving the water level digital signals from CONV 12 and producing water level data, which will be called "GAUGE DATA" hereinafter, on pressure type water level gauge 1; a read only memory (ROM) for storing water level data, which will be called "SW DATA" hereinafter, on SWs 3a, 3b and 3c and a base datum used in ABN-DET 5 for detecting the abnormality of pressure type water level gauge 1; a correction value calculator (CORRECT VALUE CAL) 44 for calculating a correction value by comparing GAUGE DATA with SW DATA; an error corrector (ERROR CORRECTOR) 46 for producing corrected water level data of the invented water level measuring apparatus; and an initially setting unit (INITIAL SET) 47 for setting a true water level of the dam when the water level measuring apparatus is initially operated.

The ABN-DET 5 consists of a comparator (COM) 51 for comparing the correction value sent from CORRECT VALUE REG 45 with the base datum sent from ROM 43 and producing a judging result whether pressure type water level gauge 1 operates normally. Wherein, the base datum is a datum on a water level error allowed in the pressure type water level gauge 1.

In order to explain the operation of CORRECT 4 and ABN-DET 5 concretely, it is supposed that SWs 3a, 3b and 3c are arranged in the dam every 10 m from bottom 201 in accordance with the example in the explanation of equation (3) and water surface 100 is raised between SWs 3b and 3c as shown in FIG. 3, passing through SW 3b set up at the place 20 m high from bottom 201.

When water surface 100 passes through SW 3b, lead-switch 31 makes contact so as to give ON-OFF DET 41 ON signal, so that ON-OFF DET 41 produces a triggering signal on SW 3b. The triggering signal on SW 3b is sent to ROM 43, so that the water level datum corresponding to SW 3b is read out and sent to a register provided in CORRECT VALUE CAL 44. The triggering signal on SW 3b is also sent to CORRECT VALUE CAL 44 for clearing the register before registering the water level datum on SW 3b. The register keeps the water level datum on SW 3b storing until another triggering signal on SW 3c or 3a is sent to ON-OFF DET 41.

Meanwhile, the water level datum from pressure type water level gauge 1 is continuously sent to CORRECT VALUE CAL 44 and ERROR CORRECTOR 45 through PARALLEL INPUT 42.

In CORRECT VALUE CAL 44, the water level datum on SW 3b read out from ROM 43 is subtracted from the water level datum from PARALLEL INPUT 42, producing a correction value datum having an adding mark when the water level datum from pressure type water level gauge 1 is smaller than the read water level datum on SW 3b and a subtracting mark when water level datum from pressure type water level gauge 1 is larger than the read water level datum on SW 3b. The correction value datum is stored in CORRECT VALUE REG 45.

In ERROR CORRECTOR 45, the error correction is performed by adding the correction value datum read out from CORRECT VALUE REG 45 to the water level datum sent from PARALLEL INPUT 42.

As seen from the above description, in ERROR CORRECTOR 46, the water level datum from PARALLEL INPUT 42 is corrected to the water level datum on SWs 3a, 3b or 3c stored in ROM 43. every time water surface passes through SWs 3a, 3b and 3c. When water surface 100 is raised or lowered from the position shown in FIG. 3, the water level datum from PARALLEL INPUT 42 is corrected by adding the correction value until water surface 100 passes through SW 3c or 3a which is adjacent to SW 3b. This is illustrated in FIG. 6(b), compared with FIG. 6(a) illustrating the error produced in the prior art water level measuring apparatus.

Figure 6A:
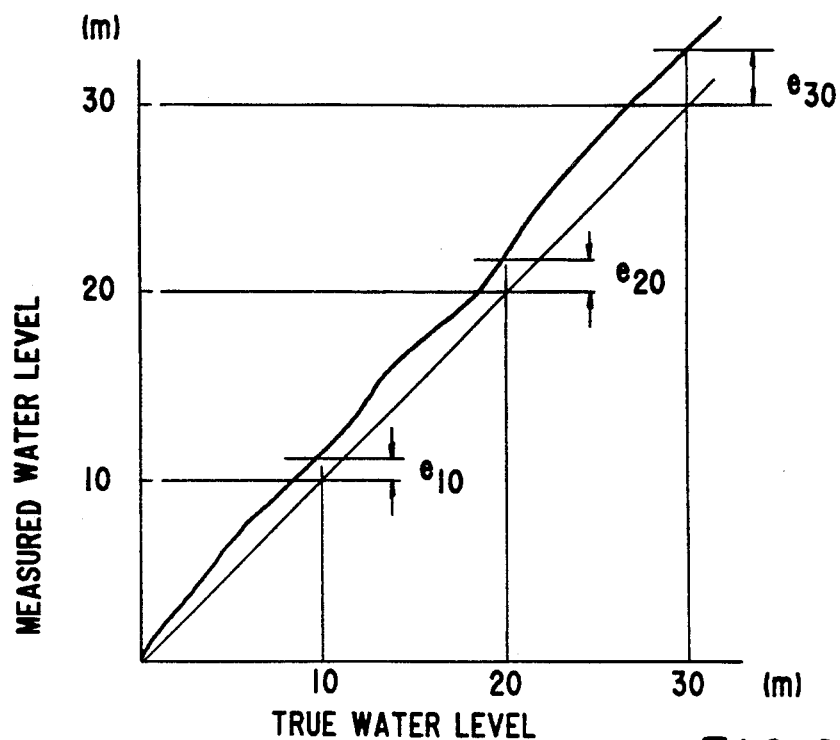
FIG. 6(a) is a graph for a water level measured by the prior art water level measuring apparatus.
Figure 6B:
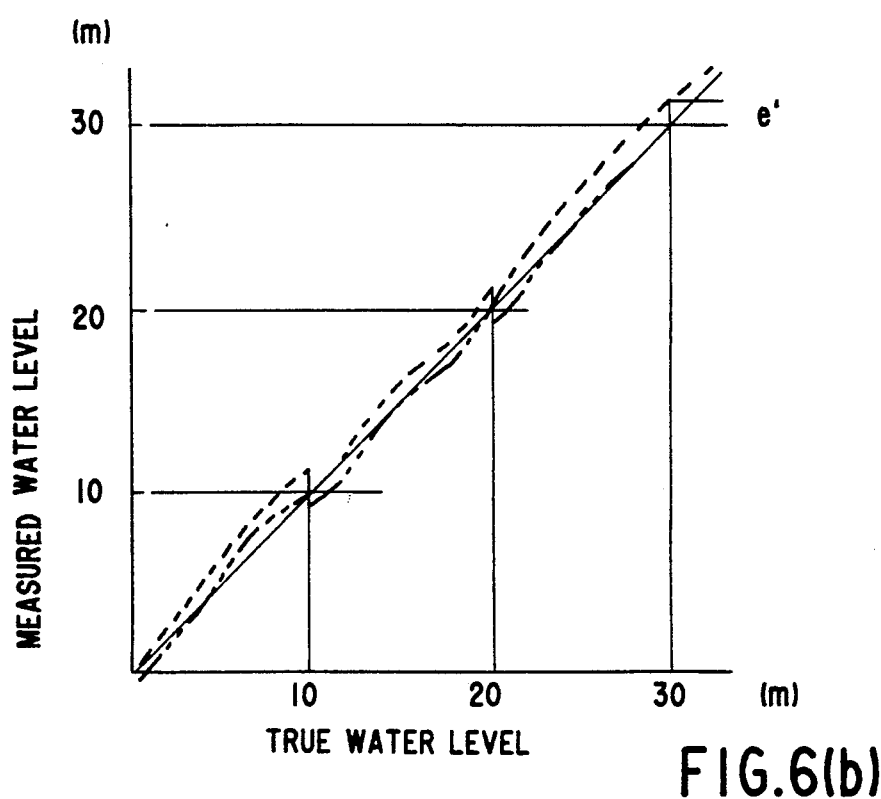
FIG. 6(b) is a graph for a water level measured by the invented water level measuring apparatus.

In FIGS. 6a and 6b, the axis of abscissas and the axis of ordinates represent the true water level and measured water level respectively, so that a diagonal line represents an ideal line having no error, respectively. As shown in FIG. 6(a), in the prior art, error $e_{10}$ appears at 10 m true water level and errors $e_{20}$ and $e_{30}$ appear at 20 m and 30 m true water level, respectively. That is, FIG. 6(a) shows that in the prior art, the error is accumulated as the water level increases. In the present invention however, as shown in FIG. 6(b), the water level measured by pressure type water level gauge 1 is corrected to a water level obtained by subtracting the correct value from the water level measured by pressure type water level gauge 1. The corrected water level is represented by a dotted curve and a one dotted chain curve when water surface 100 is raised up and lowered down respectively. Since SWs 3a, 3b and 3c produce ON-OFF signals at their water levels in high accuracy, an error, which is represented by e' in FIG. 6(b), produced between 0 m to 10 m, 10 m to 20 m, and 20 m to 30 m never exceeds the tolerance. Thus, the error produced by the invented water level measuring apparatus is always kept so as to be within the tolerance.

In the above, CORRECT 4 is explained in a case where the invented water level measuring apparatus operates in a steady state. However, when the water level measuring apparatus operates at the first time after installation, no ON-OFF signal is sent from SWs 3a, 3b and 3c to ON-OFF DET 41, so that no triggering signal is output from ON-OFF DET 41. In this case, an initial triggering signal is produced from ON-OFF DET 41 by manually operating INITIAL SET 47 connected with ON-OFF DET 41 in FIG. 5. At the beginning of operating the water level measuring apparatus after the installation, operator can recognize the position of water surface 100. Therefore, the operator selects one of SWs 3a, 3b and 3c and operates INITIAL SET 47 so that INITIAL SET 47 generates ON-OFF signal corresponding to the selected SW and sends the ON-OFF signal to ON-OFF DET 41. Not depicted in FIG. 5, circuits for the selection and generation are provided in INITIAL SET 47.

In FIG. 5, the datum on the correction value is sent to COM 51 in which the correction value datum is compared with a datum on an error allowed to pressure type water level gauge 1. The datum on the allowed error will be called an "allowed datum" hereinafter. If the correction value datum exceeds the allowed datum, ABN-DET 5 produces an abnormal signal indicating that pressure type water level gauge 1 operates in an abnormal. The abnormal condition detection is performed every time the correction value is obtained. The allowed datum is previously determined as, for example, 3 cm and stored in ROM 43.

In the above description in reference to FIG. 5, the process of advancing the error correction and the abnormal detection can be performed by using computer means such as a CPU.

I claim:

1. An apparatus for measuring a water level of a dam, said apparatus comprising:

a pressure type water level gauge (1) comprising a water pressure detector (11) set on a bottom (201) of the dam for detecting pressure of the water in the dam, said gauge converting the detected water pressure to a water level of the dam and producing a datum on the water level;

a plurality of float type water level switches (3a, 3b and 3c) arranged on support means in the dam and spaced at intervals along a depth of the dam to detect water surface movements at different levels of the dam, each interval between the bottom and one of said switches placed just above the bottom and between other ones of said switches and an adjacent switch being less than a measuring span tolerance in water level measurement of said gauge, and each of said switches producing an ON-OFF signal every time a water surface of the dam passes through said switch;

means (44) for obtaining in response to an ON-OFF signal produced by a switch, a datum on a correction value being a water level difference between the water level at that switch and the water level measured by said gauge, each time the water surface passes through that switch; and correction means (46) for correcting, due to the ON-OFF signal, the water level measured by said gauge to a water level obtained by subtracting the datum on the correction value at said switch through which the water surface has passed most recently, from the datum on the water level measured by said gauge, when the water surface is located between the water pressure detector and said one switch placed just above the bottom or between adjacent ones of said switches, respectively.

2. An apparatus according to claim 1 further comprising means (5) for detecting abnormality of said gauge in operation, by detecting whether the datum on the correction value exceeds an allowed datum on a water level allowed to said gauge having as far as said gauge is normal in operation.

3. An apparatus according to claim 2 further comprising memory means (43) for storing data on water levels at said switches and the allowed datum, said ON-OFF signal triggering said memory means to read out the stored data from said memory means for performing said correction means.

4. An apparatus according to claim 3 further comprising means (47) for producing an initial ON-OFF signal for triggering said memory means to read out the datum on the water level at said switch located closest to the water surface when said gauge and switches are initially operated after installation.

* * * * *